May 9, 1933.     H. L. FLATHER     1,908,592

WORK ROTATING STRUCTURE FOR MACHINE TOOLS

Filed April 18, 1931

Inventor:
Herbert L. Flather,
by Emery, Booth, Varney & Townsend.
Attys.

Patented May 9, 1933

1,908,592

UNITED STATES PATENT OFFICE

HERBERT L. FLATHER, OF NASHUA, NEW HAMPSHIRE

WORK-ROTATING STRUCTURE FOR MACHINE TOOLS

Application filed April 18, 1931. Serial No. 531,131.

This invention relates to mountings for face-plates, chucks, fixtures and similar parts, on spindles of lathes and other machine tools. The conventional mounting comprises a screw-thread on the spindle and a mating thread on the part to be mounted. That type of mounting has several objections, among which may be mentioned, first, lack of rigidity when subjected to heavy strains; second, inaccuracy, because it has been demonstrated that it is impossible to put on and take off a face-plate or other similar part repeatedly without the threads becoming worn and inaccurate; third, that if a spindle running at present-day speeds be stopped suddenly, the momentum of the part screwed to the spindle is sufficient to cause such part to unscrew from the spindle, with the possibility of causing damage to the work and to the machine, and injury to the workman; and fourth, the necessity of the exercise of great care on the part of the workman to see that the screw-threads are free from foreign matter, and properly lubricated before being screwed together. When neglect of this sort occurs, the parts become jammed, or "frozen" together, with the result that the screw-threads are damaged and, in extreme cases, injured beyond repair.

The object of my invention is to overcome these objections, and to provide a simple, rigid, accurate and durable means for interchangeably mounting face-plates, chucks, fixtures and other parts of different diameters on the ends of spindles or their equivalents. Although the spindle shown in the drawing is that of a lathe, my invention is not limited to that particular machine, as the invention may be employed advantageously in any situation where the results desired are similar to those which are found desirable in lathe work.

The invention will best be understood by reference to the following description, when taken in connection with the accompanying drawing of one specific embodiment thereof, while its scope will be pointed out more particularly in the appended claims.

In the drawing:—

Figure 1:
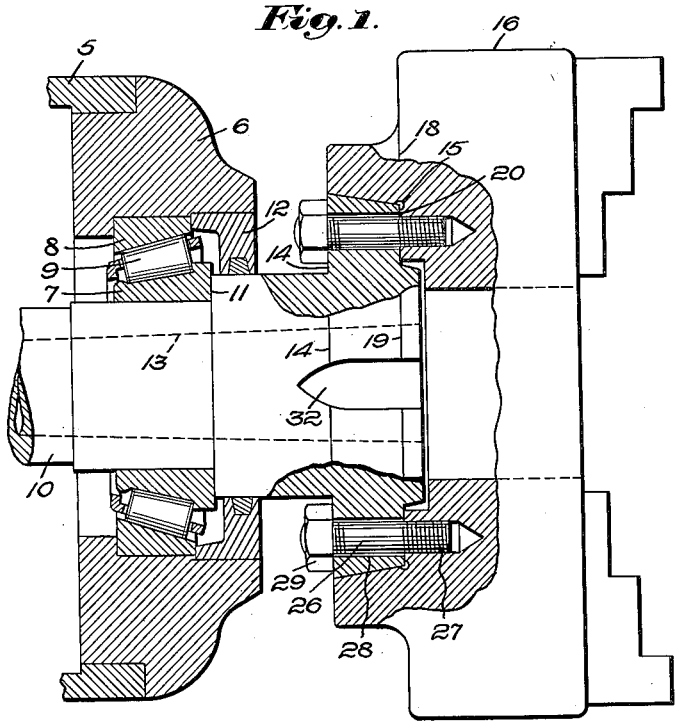
Fig. 1 is a longitudinal, sectional view of a work-rotating structure exemplifying the invention, showing a large chuck in place on the spindle.
Figure 2:
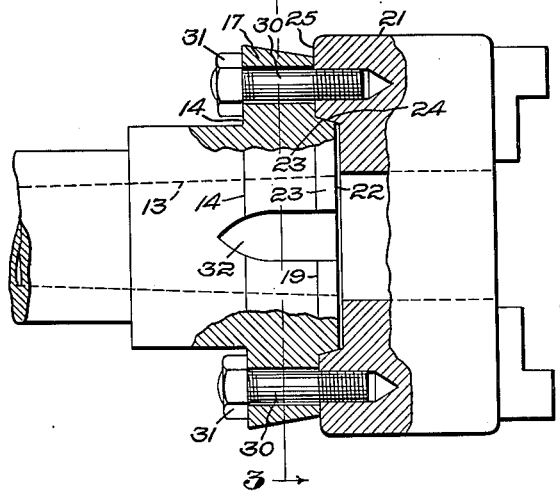
Fig. 2 is a longitudinal, sectional view of the spindle with the large chuck removed, and with a smaller chuck in place.

Referring to the drawing, and to the embodiment of the invention which is illustrated therein, there is shown a portion of a head-stock 5 of a lathe, and in this head-stock there is a front spindle bearing mounting 6, in which there is mounted an appropriate bearing, herein a roller bearing, comprising inner and outer races 7 and 8 and a set of rollers 9. A spindle 10, mounted in the inner race, is provided with a shoulder 11, which rests against the outer end of the race. A lubricant-retaining ring 12, seated within the bearing mounting, prevents the escape of lubricant from the bearing. The spindle is provided with a usual, internal taper 13, to receive a tapered socket (not shown), the latter in turn receiving a usual lathe center (not shown).

In accordance with my invention, the spindle is provided with an enlargement in the nature of an annular flange 14, which is received in a chamber 15 presented by a body which, as shown in Fig. 1, is a large chuck 16. In the embodiment shown, the enlargement or flange 14 has a peripheral tapered surface 17, which snugly fits a corresponding surface 18 in the chuck or other body, and the enlargement has a face 19 which contacts with a corresponding face 20 within the chuck or other body.

For the mounting of a chuck 21 or other body which is too small to go on and about the surface 17, the spindle is provided with a reduced portion 22, projecting forwardly from the face 19, and having a peripheral tapered surface 23, which snugly fits a corresponding surface 24 in the chuck or other body, and the latter has a face 25, which contacts with the face 19 of the enlargement 14. As herein shown, the faces 19, 20 and 25, are perpendicular to the axis of rotation.

Thus, the chucks or other bodies of different diameters are interchangeable, and either, when mounted on the spindle, is positioned accurately on the latter concentric with its axis. In the case of the larger chuck or other body, the latter is drawn into its proper position on the spindle by fastening means herein comprising a plurality of members such as studs 26, extending lengthwise of the axis of the spindle and secured to the body as by screw-threads 27. In applying the body to the spindle, these studs are passed through openings 28, in which they loosely fit, and the chuck or other body is drawn firmly into place, and is maintained in its proper position by nuts 29 threaded onto the inner ends of the studs. In the case of the smaller chuck or other body, similar studs 30 and nuts 31 are provided for a like purpose.

Figure 3:
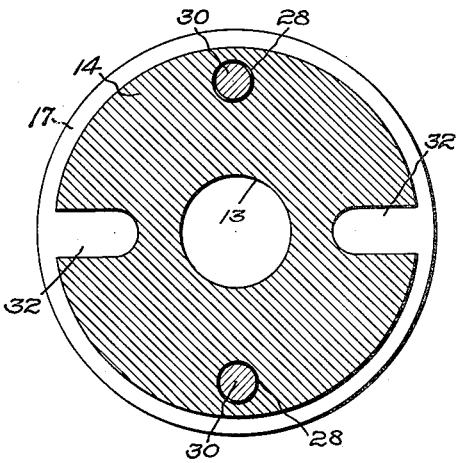
Fig. 3 is a sectional view on line 3—3 of Fig. 2.

The enlargement 14 is provided with a pair of slots 32 (see Fig. 3) to receive a work-driver, such as a usual dog (not shown) employed when the work piece is mounted on the lathe center. Any conventional means for driving the work by the aid of these slots may be employed. This direct connection of the work-driver to the spindle affords a positive drive, as nothing can come apart.

Having thus described one embodiment of the invention, but without limiting myself thereto, what I claim and desire by Letters Patent to secure is:—

1. In a work-rotating structure for machine tools, the combination of a spindle having two peripheral surfaces of different diameters, one to receive an internal surface of one work-rotating body and the other to receive an internal surface of another work-rotating body, and a single means to secure each of said bodies to said spindle.

2. In a work-rotating structure for machine tools, the combination of a spindle having two peripheral surfaces of different diameters, one to receive an internal surface of one work-rotating body and the other to receive an internal surface of another work-rotating body, said spindle having also a third surface disposed at an angle to said peripheral surfaces and adapted to receive a second surface of each of said bodies, and means to secure each of said bodies to said spindle.

3. In a work-rotating structure for machine tools, the combination of a spindle having two peripheral surfaces of different diameters, one to receive an internal surface of one work-rotating body and the other to receive an internal surface of another work-rotating body, said spindle having also a third surface disposed at an angle to and between said peripheral surfaces and adapted to receive a second surface of each of said bodies, and means to secure each of said bodies to said spindle.

4. In a work-rotating structure for machine tools, the combination of a spindle having two peripheral surfaces of different diameters, one to receive an internal surface of one work-rotating body and the other to receive an internal surface of another work-rotating body, said spindle having also a third surface disposed perpendicular to the axis of rotation and adapted to receive a second surface of each of said bodies, and means to secure each of said bodies to said spindle.

5. In a work-rotating structure for machine tools, the combination of a spindle having two peripheral surfaces of different diameters, one to receive an internal surface of one work-rotating body and the other to receive an internal surface of another work-rotating body, said spindle having also a third surface disposed perpendicular to the axis of rotation and between said peripheral surfaces and adapted to receive a second surface of each of said bodies, and means to secure each of said bodies to said spindle.

6. In a work-rotating structure for machine tools, the combination of a spindle having two peripheral surfaces of different diameters, one to receive an internal surface of one work-rotating body and the other to receive an internal surface of another work-rotating body, said spindle having also a third surface disposed at an angle to said peripheral surfaces, and means extending through said third surface to secure each of said bodies to said spindle.

7. In a work-rotating structure for machine tools, the combination of a spindle having two peripheral, tapered surfaces of different diameters, one to receive an internal surface of one work-rotating body and the other to receive an internal surface of another work-rotating body, and a single means to secure each of said bodies to said spindle.

8. In a work-rotating structure for machine tools, the combination of a spindle provided with an enlargement having two peripheral, tapered surfaces of different diameters, one to receive an internal surface of one work-rotating body and the other to receive an internal surface of another work-rotating body, and a single means to secure each of said bodies to said spindle.

9. In a work-rotating structure for machine tools, the combination of a spindle having two peripheral, tapered surfaces of different diameters, one to receive an internal surface of one work-rotating body and the other to receive an internal surface of another work-rotating body, said spindle having also a third surface disposed at an angle to said peripheral surfaces and adapted to receive a second surface of each of said bodies, and means separate from said peripheral surfaces to secure each of said bodies to said spindle.

10. In a work-rotating structure for machine tools, the combination of a spindle having two peripheral, tapered surfaces of different diameters, one to receive an internal surface of one work-rotating body and the other to receive an internal surface of another work-rotating body, said spindle having also a third surface disposed at an angle to and between said peripheral surfaces and adapted to receive a second surface of each of said bodies, and means separate from said peripheral surfaces to secure each of said bodies to said spindle.

11. In a work-rotating structure for machine tools, the combination of a spindle having two peripheral, tapered surfaces of different diameters, one to receive an internal surface of one work-rotating body and the other to receive an internal surface of another work-rotating body, said spindle having also a third surface disposed perpendicular to the axis of rotation, and means separate from said peripheral surfaces to secure each of said bodies to said spindle.

12. In a work-rotating structure for machine tools, the combination of a spindle having two peripheral, tapered surfaces of different diameters, one to receive an internal surface of one work-rotating body and the other to receive an internal surface of another work-rotating body, said spindle having also a third surface disposed perpendicular to the axis of rotation and between said tapered surfaces, and means separate from said peripheral surfaces to secure each of said bodies to said spindle.

13. In a work-rotating structure for machine tools, the combination of a spindle provided with a frusto-conical flange having a peripheral surface to receive an internal surface of one work-rotating body, said spindle being provided with a frusto-conical portion having a peripheral surface of smaller diameter than the first-mentioned peripheral surface and adapted to receive an internal surface of another work-rotating body, and means to secure each of said bodies to said spindle.

14. In a work-rotating structure for machine tools, the combination of a spindle provided with a frusto-conical flange having a peripheral surface to receive an internal surface of one work-rotating body, said spindle being provided with a frusto-conical portion having a peripheral surface of smaller diameter than the first-mentioned peripheral surface and adapted to receive an internal surface of another work-rotating body, said flange having an outer end face adapted to be engaged by each of said bodies, and means to secure each of said bodies to said spindle.

15. In a work-rotating structure for machine tools, the combination of a spindle provided with a frusto-conical flange having a peripheral surface to receive an internal surface of one work-rotating body, said spindle being provided with a frusto-conical portion having a peripheral surface of smaller diameter than the first-mentioned peripheral surface and adapted to receive an internal surface of another work-rotating body, said flange having inner and outer end faces, the outer end face being adapted to be engaged by each of said bodies, and means to secure each of said bodies to said spindle, said means including a part engaging said inner end face.

16. In a work-rotating structure for machine tools, the combination of a spindle provided with a frusto-conical flange having a peripheral surface to receive an internal surface of one work-rotating body, said spindle being provided with a frusto-conical portion having a peripheral surface of smaller diameter than the first-mentioned peripheral surface and adapted to receive an internal surface of another work-rotating body, and means to secure each of said bodies to said spindle, said means being disposed radially inwardly with relation to the second-mentioned peripheral surface.

17. In a work-rotating structure for machine tools, the combination of a spindle provided with a frusto-conical flange having a peripheral surface to receive an internal surface of one work-rotating body, said spindle being provided with a frusto-conical portion having a peripheral surface of smaller diameter than the first-mentioned peripheral surface and adapted to receive an internal surface of another work-rotating body, and means to secure each of said bodies to said spindle, said means being disposed radially outwardly with relation to the second-mentioned peripheral surface.

In testimony whereof, I have signed my name to this specification.

HERBERT L. FLATHER.